(12) United States Patent
Marissal et al.

(10) Patent No.: US 8,367,782 B2
(45) Date of Patent: Feb. 5, 2013

(54) POLYMER STREAM TRANSFER

(75) Inventors: Daniel Marissal, Carry la Rouet (FR); Marc Parisel, Vilvoorde (BE); Brent Walworth, Sint-Niklaas (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 59 days.

(21) Appl. No.: 12/736,452

(22) PCT Filed: Apr. 15, 2009

(86) PCT No.: PCT/EP2009/054441
§ 371 (c)(1),
(2), (4) Date: Feb. 10, 2011

(87) PCT Pub. No.: WO2009/127645
PCT Pub. Date: Oct. 22, 2009

(65) Prior Publication Data
US 2011/0166313 A1    Jul. 7, 2011

(30) Foreign Application Priority Data
Apr. 16, 2008  (EP) ................................. 08154616

(51) Int. Cl.
C08F 2/00      (2006.01)
C08F 110/02    (2006.01)

(52) U.S. Cl. ............................ 526/61; 526/64; 526/352

(58) Field of Classification Search ................... 526/61, 526/64, 352
See application file for complete search history.

(56) References Cited

U.S. PATENT DOCUMENTS

| | | | |
|---|---|---|---|
| 3,195,613 A * | 7/1965 | Hawkins | ..................... 159/47.1 |
| 3,428,619 A | 2/1969 | Hawkins et al. | |
| 4,126,743 A | 11/1978 | Shiomura et al. | |

FOREIGN PATENT DOCUMENTS

| | | |
|---|---|---|
| EP | 1 914 248 A1 | 4/2008 |
| EP | 1 914 250 A1 | 4/2008 |
| GB | 2 157 701 A | 10/1985 |
| WO | WO 2008/043472 A1 | 4/2008 |

* cited by examiner

*Primary Examiner* — William Cheung
(74) *Attorney, Agent, or Firm* — Nixon & Vanderhye

(57) ABSTRACT

Process for heating a polymer-containing stream being transferred from a polymerization reactor to a separation zone or device, by passing the stream through a heater having at least one transfer line for the stream and a heater for heating the transfer line. The average particle size of the solid polymer is less than 3mm, the mass flowrate of the polymer-containing stream exiting the heater is no more than 15% greater than the mass flowrate exiting the reactor, the average velocity of the polymer-containing stream either at a point 80% along the length of the heated part of the transfer line measured from the transfer line inlet, or at the transfer line outlet, is at least 6 m/s, and the pressure drop across the transfer line per unit length is between 0.0125 bar/m and 0.1 bar/m.

17 Claims, No Drawings

POLYMER STREAM TRANSFER

This application is the U.S. national phase of International Application No. PCT/EP2009/054441 filed 15 Apr. 2009 which designated the U.S. and claims priority to European Application No. 08154616.0 filed 16 Apr. 2008, the entire contents of each of which are hereby incorporated by reference.

The present invention concerns apparatus for improving the degassing of polymers, particularly olefin polymers.

Polymerisation of olefins in which an olefin monomer and optionally olefin comonomer are polymerised, usually in the presence of a catalyst and/or a diluent, is well known. The polymer is withdrawn from the polymerisation reactor together with the reagents and inert hydrocarbons. The reagents and hydrocarbons need to be recovered for economic, safety and environmental reasons, and many processes for achieving this are known in the art. These processes generally involve depressurising and devolatilising the polymer-containing stream after it has been withdrawn from the polymerisation reactor. The volatisation requirement is greatest in processes having polymer withdrawn from the reactor with high absorbed or free liquid hydrocarbon contents. These are typically processes producing polymers with a significant low density component or amorphous phase where the absorption of hydrocarbon is high, and/or processes where the polymer is produced in the presence of liquid hydrocarbons (reactive or inert).

The maximum capacity of commercial scale plant has increased steadily over the years, and as production rates have increased the potential cost impact of unreliability in any part of the process has also significantly increased, impacting not only the polymer unit itself but also upstream and downstream units. At the same time, growing operating experience has led to operation of increasingly high solids concentrations (loadings) of polymer withdrawn from reactors. The increase in solids concentrations in slurry polymerisation units has typically been achieved with increased circulation velocities achieved for example by higher reactor power requirements as illustrated by EP 432555 and EP 891990. This increase in solids loadings is desirable as it increases reactor residence time for a fixed reactor volume and also reduces downstream diluent treatment and recycling requirements. However, the transfer of the product at high solids loadings is more problematic and careful design and operating practices are required to avoid polymer fouling and blockage problems that would not have been experienced at lower solids loadings.

During, and as a result of, the process of depressurising and devolatilising the polymer stream withdrawn from the polymerisation reactor, the temperature of the polymer reduces. It is well known that the process of devolatilising and desorbing the polymer is significantly enhanced by maintaining the polymer at as high a temperature as possible. Thus, in slurry processes the transfer line between the polymerisation reactor and the depressurisation (degassing) vessel for the polymer stream is usually heated. As an example of a typical process, in WO 04/031245 and WO 05/044871 the take-off line from a loop polymerisation reactor comprises a flashline containing the drawn-off slurry, surrounded by a conduit which is provided with a heated fluid such as low-pressure steam in order to provide indirect heating to the slurry. However it is also well known that the stickiness of the polymer being transferred, and its susceptibility to agglomerate and/or foul transfer lines and vessels, generally increases with increasing temperature and decreasing velocity, and problems of fouling or agglomeration are becoming more significant with the increasing solids loadings in the transfer system now being utilised as mentioned above. As a result, careful design of the transfer line from the polymerisation reactor is required in order to achieve sufficient heating to aid devolatilisation without risking fouling or agglomeration of the solid polymer.

Devolatilisation of the polymer stream causes the liquid phase of the stream to vaporise, resulting in an increase in volume in the transfer line and a consequent increase in stream velocity. However if the velocity becomes too high it may exceed the sonic velocity (the speed of sound in the medium), leading to disruption of the flow. On the other hand, if the initial velocity is too low there is an increased risk of fouling or agglomeration of the solid polymer as mentioned above.

A further consideration is that in large plants the transfer line has to be very long in order to allow sufficient heating to take place, and the length can be sufficiently great to impact the spatial planning of the plant. This can create a variety of problems such as footprint of the hardware in the plant, and control of the conditions inside the line. Often it is necessary to heat a significant proportion of the transfer line length to satisfy the heat input requirements. Thus it will be appreciated that ensuring that the polymer stream arrives at the degassing vessel at the desired temperature and pressure and with the minimum of fouling/agglomeration is a significant technical challenge.

GB 2157701A discloses a process in which a polymer slurry is discharged from a high pressure zone to a low pressure zone via piping which is surrounded by a number of heaters, and which may increase in diameter in the direction of flow. Typical inlet velocities for the slurry are 3-20 m/s, and typical outlet velocities are 14-150 m/s. The flow of slurry is controlled by adjusting the pressure drop down the piping, by adding additional diluent and vaporising it and optionally also by changing the number of heaters in operation so as to adjust the amount of vapour. There is no mention of fouling or any problems associated therewith.

The present invention seeks to optimise heating of the polymer during its transfer from the reactor to the degassing vessel and at the same time to minimise the risk of fouling. We have found that this can be done without adding additional diluent or other hydrocarbons into the polymer-containing stream.

Accordingly in a first aspect the invention provides a process for heating a polymer-containing stream being transferred from a polymerization reactor to a separation zone or device, comprising passing the stream through a heater comprising at least one transfer line for the stream and means for heating the transfer line, wherein the average particle size of the solid polymer is less than 3 mm, the mass flowrate of the polymer-containing stream exiting the heater is no more than 15% greater than the mass flowrate exiting the reactor, the average velocity of the polymer-containing stream either at a point 80% along the length of the heated part of the transfer line measured from the transfer line inlet, or at the transfer line outlet, is at least 6 m/s, preferably at least 8 m/s and more preferably at least 10 m/s, and the pressure drop across the transfer line per unit length is preferably between 0.01 bar/m and 0.2 bar/m, preferably between 0.0125 bar/m and 0.1 bar/m, most preferably between 0.0125 bar/m and 0.04 bar/m.

The minimum velocity 80% along the length of the heated part of the transfer line is required in order to reduce the risk of fouling. Generally if the average velocity of the polymer-containing stream 80% along the length of the heated part of the transfer line is greater than 6 m/s, it will also be greater than 6 m/s at the transfer line outlet (where it is more conveniently measured). However the invention also encompasses the possibility that the velocity at the outlet is lower than 6 m/s, for example due to a particular construction at the outlet.

It is also preferred that the average velocity of the polymer-containing stream at 80% along the length of the heated part of the transfer line measured from the transfer line inlet is equal to or greater than its average velocity at 20% along the length of the heated part of the transfer line.

It will be appreciated that the polymer-containing stream passes through some form of pipeline at all times from the moment it leaves the polymerisation reactor until it enters the degassing vessel. For the purposes of this invention, the heater is considered to comprise the portion of pipeline from the beginning of the heated section of the transfer line (or the first of the heated sections) until the end of the heated section (or last of the heated sections). In this context the term "transfer line" or "heater" as used hereinafter includes within its scope the possibility of a number of heated sections connected in series. The outlet of the heater (or transfer line of the heater) is considered to be at the end of the heated section of the line, and the inlet of the heater is considered to be at the start of the heated section of the line, where the heated section of the line incorporates the single heated sections or multiple heated sections in series. In the case where the line consists of a number of discrete heated sections, one or more of these sections may be separated by a pressure control valve. By "line" is meant any form of conduit suitable for transporting a polymer-containing stream containing solids, liquid and gas. This may include a plurality of pipes or other conduits in parallel, enclosed within a single heating unit.

When considering the construction of the heater described below, the length L is considered to be the total length from the inlet of the heater to the outlet of the heater. However when considering the length of the "heated part of the transfer line", this length excludes any unheated sections. Thus in the case where a heater comprises several heated sections joined by unheated sections, the length L of the heater is the total length of both heated and unheated sections, whereas the length of the "heated part of the transfer line" is the length of the heated sections only. 20% along the length of the heated part of the transfer line is thus 20% along the total length of the heated sections only, as measured from the start of the first heated section.

The velocity of the polymer-containing stream is defined as the volumetric flow rate of the polymer-containing stream divided by the cross section of the stream flow path.

By "average velocity" is meant the average velocity measured over a period of at least 5 minutes but no more than 1 hour across the entire cross-section of the stream at any one point along the length of the transfer line. In some known operations, the input of polymer-containing stream into the transfer line is discontinuous, as the stream is first discharged from the reactor into settling legs, which themselves discharge into the transfer line only when full. Although the input into the transfer line can be smoothed by using a number of settling legs which fill and discharge in sequence, the flowrate and hence stream velocity in the transfer line is not constant. Variation in flowrate can also occur in continuous discharge when the valve controlling the discharge is periodically moved in order to prevent buildup of polymer and possible fouling. Thus it is important to consider an average velocity over a period of time rather than the velocity at any one instant.

The volumetric flow rate is the sum of volumetric flows of each of the solid, liquid and gas phases. The amount of gas and liquid, and their respective densities are calculated, where appropriate, based on thermodynamic equilibrium properties usually requiring heat balance, composition, pressure and temperature of the stream. For a given mixture, at any point of the heater, the vapour fraction is a function of pressure and temperature. As the pressure gradient through a pipe is also a function of vapour fraction and physical properties (so do the pressure and temperature) the mass flow, the heat transfer and the thermodynamic equilibrium can be solved together. The basic equations to establish the pressure gradient in the three phase Vapour-Liquid-Polymer flow are the conservation of momentum and energy equations.

The average velocity of the polymer-containing stream at 80% along the length of the heated part of the transfer line measured from the transfer line inlet is at least 20 m/s, preferably at least 30 m/s.

It is preferred that the mass flowrate of the polymer-containing stream exiting the heater is no more than 5% greater than the mass flowrate exiting the reactor, and more preferably is the same or less than that exiting the reactor. In other words, it is preferred that no additional fluid is added to the polymer-containing stream between leaving the reactor and exiting the heater.

In one embodiment of the invention, the mass flowrate of the polymer-containing stream varies by less than 20% (based on the maximum flowrate) over any 1 hour period; this is consistent with continuous flow into the transfer line, due to continuous discharge from the polymerisation reactor. In an alternative embodiment, the mass flowrate varies by more than 20% (based on the maximum flowrate), consistent with discontinuous discharge from the reactor.

The heating and depressurisation of the polymer stream as it travels along the transfer line to the degassing vessel causes a progressive vaporisation of the liquid in the stream and a resultant increase in velocity along the line. There are conflicting requirements to satisfy when designing the transfer line in order to ensure effective and reliable polymer transfer and heat transfer. Whilst high velocities enhance heat transfer and generally minimise fouling, they also lead to high pressure drops along the line. It is important therefore to be able to optimise transfer line length and diameter while maintaining the required heat transfer area and heat transfer coefficient, so as to obtain a sufficiently de-volatised polymer at an acceptable temperature.

Fouling occurs most commonly when combining low velocity with high temperature. Along the length of the transfer line several hydraulic regimes exist that modify the overall heat transfer coefficient between the wall and the fluid. Above a certain wall temperature, liquid can no longer exist in contact with the metal surface, and the wall surface becomes surrounded by a stable vapour film which reduces the heat transfer coefficient (film flow). This typically starts within the first 20% of the length of the heated part of the transfer line. However at increasingly high delta temperature values, heat transfer by radiation through the vapour film becomes significant and the heat flux starts increasing again. As the vapour fraction continues to increase, mist flow occurs: the liquid is dispersed in droplets inside a continuous vapour phase which impacts the heat transfer coefficient. The mist flow regime usually commences after 60% of the length of the heated part of the transfer line, most usually between 60 and 80% along the length. Thus according to the invention, it is usual that the average velocity in the mist flow region is equal to or higher than that in the film flow region. Preferably the average velocity at any point in the mist flow region is at least 4 m/s, more preferably at least 6 m/s, or even at least 10 m/s. When almost all the liquid is evaporated, a pure convective regime occurs.

Preferably the ratio of the average velocity of the polymer-containing stream at 80% along the length of the heated part of the transfer line to its average velocity at 20% along the length of the heated part of the transfer line is at least 1.1, and more preferably at least 1.3.

It is also preferred that the ratio of the average velocity of the polymer-containing stream at inlet of the heated part of the transfer line, $V_i$, to its average velocity at the outlet of the heated part of the transfer line, $V_o$, is greater than 1.1, and more preferably greater than 1.3. Typical values for $V_i$ are 2-20 m/s, and typical values for $V_o$ are 5-80 m/s. It is preferred that the average velocity at the inlet $V_i$, is at least 2 m/s, preferably at least 5 m/s and more preferably at least 8 m/s. It is also desirable to maintain the velocity below the sonic velocity. Accordingly it is preferred that the average velocity at the outlet $V_o$ is less than 80 m/s, preferably less than 70 m/s. Typically $V_o/V_i$, is at least 1.1, more usually between 1.2 and 15, preferably between 1.4 and 10, most preferably between 1.5 and 4.

Regarding the average particle size of the solid polymer in the polymer-containing stream, average particle size is defined as the size at which 50% by weight of the particles are collected using sieving granulometry according to ASTM D-1921 particle (sieve analysis) of Plastic Materials, Method A. The solids content of the polymer-containing stream has a significant impact on the heating requirement in the transfer line. If the stream entering the transfer line has a high solids content, not only is the relative amount of liquid required to be heated and/or evaporated reduced, but the solid polymer at the inlet can be warmer than the outlet temperature of the stream, and therefore is carrying a significant amount of heat into the transfer line. It is important that the average particle size of the solid polymer is below 3 mm because the smaller the average particle size, the faster the heat exchange between the solid particles and the surrounding fluid. As the pressure drops in the transfer line and the surrounding fluid is vaporised it cools, whilst the solid particles remain hot. Thus it is desirable to transfer the heat of the particles to the surrounding fluid as rapidly as possible. When the average particle size is less than 3 mm, the heat transfer is sufficiently rapid that the solid and fluid have approximately the same temperature, and the solid can reasonably be considered to be in heat equilibrium with the bulk fluid.

It is preferred that the average particle size of the solid polymer is less than 2 mm, and more preferably less than 1 mm. The average particle size can be even lower, such as 800 μm or even 600 μm.

It is preferred the temperature of the polymer-containing stream at the outlet of the transfer line is above the dew point of the stream. Preferably, the temperature of the polymer-containing stream at the heater exit is 5-80° C., most preferably 10-40° C., above the dew point of the stream.

It is also preferred that the temperature of the stream itself along the heated length of the transfer line is maintained below the softening point of the polymer, where the softening point of the polymer is defined as the Vicat softening temperature according to ASTM D1525, ISO 306 under a load of 10N. This is the temperature at which a flat-ended needle penetrates a specimen of the polymer to a depth of 1 mm under a load of 10N. The temperature reflects the point of softening to be expected when a material is used in an elevated temperature application. A test specimen, which is between 3 mm and 6.5 mm thick and at least 10 mm in width and length, is placed in the testing apparatus (for example a ROSAND ASP 6 HDT/VICAT System) so that the penetrating needle, which has a cross-sectional area at its tip of 1 mm², rests on the specimen surface at least 1 mm from the edge. A load of 10N is applied to the specimen. The specimen is then lowered into an oil bath at 23° C. The bath is raised at a rate of 50° C. per hour until the needle penetrates 1 mm; the temperature at which this occurs is the Vicat softening temperature.

Heat is usually transferred to the polymer-containing stream by heating the internal surface of the transfer line using a heating medium in contact with the outer surface of the line. Thus the heat input to the stream is usually adjusted by changing the temperature of the internal surface of the transfer line. This is usually done by changing the temperature of the heating medium in contact with the outer surface. Additionally or alternatively, the heat input to the stream can be adjusted by changing the size of the heated area of the transfer line. For example, if the transfer line consists of a number of discrete heated sections, the overall heat input to the stream may be partially controlled by adjusting the temperature of the individual heated sections, or by changing the number of heated sections, ie by switching the heat input on or off to one or more of the heated sections. In one embodiment, the overall heat input to the stream is adjusted by changing only the temperature of the internal surface of the transfer line in the portion from 60% to 100% of its heated length, or even only in the portion from 80% to 100% of its heated length. It is also possible that a combination of the above, that is changing the area which is heated and changing the temperature of the heating medium, may be employed.

It is preferred that the temperature of the internal surface of the transfer line from 50% to 100% along its heated length is maintained below the softening point of the polymer: more preferably, the temperature of the internal surface of the transfer line throughout its heated length is maintained below the softening point of the polymer.

By maintaining the temperature of the polymer-containing stream at the heater outlet above the dew point of the stream, but the internal surface of the transfer line below the softening point of the polymer, it is possible to ensure that all of the liquid in the stream is vaporised by the time the stream reaches the heater exit, but at the same time the risk of fouling is minimised. In the case where the heater is positioned between a polymerisation reactor and a degassing vessel, the temperature of the internal surface of the transfer line may be maintained above the temperature of the reactor. For a polymer having a density of 935-945 kg/m³ the process-side wall temperature is typically controlled between 75 and 130° C., preferably between 85 and 105° C. For a polymer having a density of 955-965 kg/m³ the process-side wall temperature is typically controlled between 80 and 135° C., preferably between 95 and 110° C.

The polymer-containing stream is preferably withdrawn from a polymerisation reactor prior to entry into the transfer line, and the transfer line inlet is therefore linked directly to the polymerisation reactor. It is also preferred that the outlet of the transfer line is connected directly to a powder collecting or separating vessel which is preferably maintained at a pressure such that most of the recovered vapour can be condensed and recovered without the need of a recompression. This vessel is usually upstream of the final polymer treatment and extrusion or upstream of a further polymerization reactor. The stream may be continuously withdrawn from the polymerisation reactor, and may or may not contain active polymer.

Typical pressure at the heater inlet, $P_i$, is 5-30 bara, preferably 10-25 bara. Pressure at the outlet $P_o$ is typically 1.5-20 bara, preferably 7-11 bara. In the case where the transfer line is positioned between a polymerisation reactor and a degassing vessel, the pressure drop in the transfer line is typically between 5% and 50%, preferably between 10 and 35%, of the total pressure drop between the polymerisation reactor and the entry to the degassing vessel.

In a preferred embodiment the process of the invention, in the case where the heater is positioned between a polymerisation reactor and a degassing vessel, the polymer-containing stream is heated such that at least 90 mol %, preferably at least 98 mol % and most optimally 100 mol % of the hydrocarbon fluids withdrawn from the polymerisation reactor operation are vaporised before entry into the degassing vessel. The degassing vessel preferably operates at a pressure greater than 2 bara, most preferably between 6 bara and 12 bara whilst maintaining a pressure drop across the length of the heater of less than 0.5 bar per tonne/hour of polymer production, most preferably between 0.1 bar per te/h and 0.3 bar per te/h. It has been found that this optimised low pressure drop per unit of production can be reliably operated even at high solids loadings at entry into the heater. It is preferred that the solids content of the polymer-containing stream is between 35 wt % to 70 wt %, most preferably between 50 wt % and 65 wt % when the stream enters the heater, and it is also preferred that the velocity of the stream at the entry into the heater does not vary by more than 15%, preferably no more than 5%, in any 30 second period. One way in which this can be achieved is by using a continuous rather than discontinuous off-take from the polymerisation reactor. Such high solids loading operation combined with the expanding diameter heater enables the pressure drop of the heater to be minimised.

Regarding the construction of the heater itself, it is preferred that the ratio of the transfer line's outlet diameter $D_o$ to its inlet diameter $D_i$, $D_o/D_i$, is greater than 1, preferably between 1.2 and 10. Typically it is at least 1.3, and commonly at least 1.4. However this ratio is preferably no more than 4, and more preferably no more than 2, with a maximum of 1.9 being most preferred. It is also preferred that the ratio of the transfer line's diameter 80% along its heated length, $D_{80}$, to the diameter 20% along its heated length, $D_{20}$, is greater than 1, preferably greater than 1.2 and more preferably greater than 1.3.

We have found that increasing the diameter of the transfer line along its length allows a greater range of polymer-containing stream flowrates to be accommodated by the heater. A relatively small diameter at the inlet permits a relatively high velocity even at low flowrates, reducing the risk of fouling; whilst a relatively larger diameter at the outlet can avoid the risk of the velocity exceeding the sonic velocity even at high flowrates. Having such a range of capacities is particularly valuable during start-up and shut-down operations. In order to reduce the risk of downstream blockages it is also preferred that the outlet diameter $D_o$ of the transfer line is smaller than the solids outlet of the degassing vessel. $D_o$ is defined as the internal diameter of the transfer line at its outlet, and $D_i$ is the internal diameter of the transfer line at its inlet, where the outlet and inlet of the transfer line are defined as previously described.

The internal diameter D of the transfer line is preferably at least 20 mm, and more usually between 40 mm and 200 mm. Most preferred are internal diameters between 60 mm and 150 mm.

The total length L of the heater (including heated and unheated sections), and therefore the transfer line, is preferably at least 20 m, more preferably at least 30 m, but usually no more than 600 m. A preferred range of lengths is from 50 m to 500 m, more preferably from 70 m to 300 m.

It is preferred that the ratio of the length L of the transfer line to its average internal diameter $D_{ave}$, $L/D_{ave}$, is from 500 to 10000, preferably from 1500 to 3500, and more preferably from 2000 to 3000. If the transfer line is constructed from a number of sections each of different diameters, $D_{ave}$ is the average internal diameter of those sections weighted according to the length of each section; alternatively it may be calculated by reference to the total internal volume v of the line, where $v=(\pi D_{ave}^2 \cdot L)/4$.

If the transfer line increases in diameter along its length, it is preferred that the increase occurs in discrete steps rather than continuously, with intermediate portions of the transfer line having a constant diameter. Typically there are one, two or three increases in diameter along the length of the pipe, usually created by a conical connecting piece between the two sections of different diameter. It is preferred that the average velocity of the polymer-containing stream immediately after an increase in diameter of the transfer line is higher than the velocity at the transfer line inlet $V_i$.

It is preferred that one or all of the sections of the line are generally upright rather than mounted horizontally, as this reduces the risk of settling and hence fouling, as well as ensuring that the line has a smaller footprint in the plant: in such a configuration, the first section of the line preferably has its inlet at the bottom such that the initial flow of material through the transfer line is upwards. It is preferred that less than 20%, most preferably less than 10% of the length of the transfer line is horizontal, and optimally the line is constructed substantially without horizontal sections. In one embodiment at least the inlet and exit of the heated transfer line are oriented vertically such that the inlet flow through the line is upwards and the outlet flow from the line is downwards. In one embodiment of the invention, the transfer line comprises a series of sections connected by bends (elbows), which are typically U-shaped such that the line doubles back on itself one or more times. The advantage of this configuration is that it makes the transfer line more compact in the plant. The sections between the elbows are usually straight. The bends may be heated like the rest of the line, but usually—in order to simplify the construction of the heater— they are not heated. It is also generally preferred that any expansion in diameter of the line occurs in an unheated section of the line; therefore sections of the line may be of different diameters with the increases in diameter occurring at one or more of the elbows, preferably at the exit of the elbow such that the velocity reduces at the exit of the elbow rather than at its inlet, and most preferably at the exit of an elbow at the top of a vertically heated section. The design of the expansion sections and the bends in the transfer line is key to reliable operation without fouling. The number of vertical or horizontal sections between elbows making up the total transfer line may be from 2 up to 10, although 3 to 7 sections is more common.

The elbows of the transfer line may have varying degrees of curvature. The radius of the curve defined by the elbow may be expressed as a multiple of the diameter D of the line at that point. The elbows typically have radii of between 3 D and 30 D, with 5 D-20 D being most preferred to ensure reliable operation without fouling whilst also minimising the footprint of the line. As previously stated the elbows are preferably U-shaped, although alternative options such as L-shaped elbows that permit a smooth flow path are not excluded. Obviously a transfer line formed in sections may employ a mixture of the above types of elbow, or indeed elbows of other angles such as 60° or 120°.

It has been found that the length of any one expansion section of the transfer line should be greater than 0.25 D, preferably between 0.5 D and 10 D, most preferably between 0.75 D and 3 D. It is preferred that each expansion section is located immediately upstream or more preferably downstream of an elbow, preferably a distance of no more than 4 D from the elbow. It is also preferred that the expansion is concentric, although other expansion geometries are also possible.

It is preferred that the heater inlet is at approximately the same elevation as the exit of the polymerisation reactor to which it is linked, preferably the transfer line from the polymerisation reactor to the heater inlet is essentially horizontal.

It is most preferred that the exit of the transfer line (at the degassing vessel entry point) is at a higher elevation than the inlet of the transfer line and/or the outlet of the polymerisation reactor.

The means for heating the transfer line usually comprises a jacket surrounding the line. The heater jacket may be in the form of an electrical heater, but it is preferred that it is in the form of a concentric pipe surrounding the line through which a heating fluid is passed. The most commonly used heating fluid is steam. It has been found that conditions can be best optimised by using desuperheated steam as the heating medium, particularly where the maximum saturation temperature is 0-30° C., and preferably no greater than 10° C., below the softening point of the polymer being heated. Whichever form it takes, the jacket may either provide the same heat input along the entire length of the transfer line, or may provide differential heating at different parts of the line. It is also possible that portions of the line (such as bends) are unheated, as discussed above. We have found that the optimum heat input along the length of the transfer line is achieved with a design such that temperature of the heating medium (or the internal wall temperature of the line) is greater at the inlet to the line than at its exit. Accordingly, as the vapour fraction in the polymer-containing stream as it passes along the line increases, it is preferred that the heating medium temperature (or the internal wall temperature of the line) is decreased. This can be done in a continuously graded manner, or in a number of discrete steps by means of sections of different temperature. Most preferred however is a jacket which operates at different temperatures in different parts of the line, usually by having independent supplies of the heating medium for each section where a different temperature is required.

In a preferred embodiment of the invention, the transfer line is heated by a concentric pipe using steam as a heating medium. The outlet temperature of the transfer line is preferably controlled using the steam flowrate: for a given steam temperature this has the benefit of enabling control of the transfer line wall temperature, to ensure a lower temperature at low polymer stream flowrates and a higher temperature at higher flowrates when velocities are higher.

One way of increasing further the temperature of the polymer-containing stream itself at the transfer line outlet (apart from increasing the energy input into the heater) is to increase the solids content of the stream. This can be done by increasing the solids content of the stream withdrawn from the polymerisation reactor and/or by using a solids concentrating device upstream of the transfer line. The solids can carry more heat than the liquid or gaseous components of the stream, thereby requiring a lower input from the transfer line heater in order to achieve the desired temperature.

The use, upstream of the transfer line, of a solids concentrating device with an upstream diluent flush (as described in our patent EP1118624) is a preferred embodiment of the present invention, and enables the monomer concentration in the transfer line to be minimised, thereby reducing the risk of fouling.

It is preferred that the pipe is easily separable along the length of the heater to facilitate cleaning. Preferably the pipe is flanged at 5-15 m intervals. In the case where heating is effected using a jacket containing a heating fluid, it is preferred that the heating fluid does not cover any flange.

In order to maximise heat transfer into the polymer-containing stream, the pipe is preferably made from a material having a thermal conductivity greater than 30 $Wm^{-2} K^{-1}$, preferably greater than 40 $Wm^{-2} K^{-1}$. The pipe is typically seamless, although seam welded pipe is preferred where high heat transfer is required.

It is preferred that all of the polymer-containing stream exiting the polymerisation reactor is passed through a single transfer line, particularly at start-up. Such a transfer line may be fed by one or more withdrawal lines from the reactor. The stream withdrawn from the reactor may be concentrated, preferably by gravitational or centrifugal means, most preferably using a hydrocyclone, prior to passing through the transfer line.

However it is also within the scope of this invention to provide multiple parallel transfer lines to accept the polymer-containing stream, each of which is arranged according to the invention. Accordingly a further aspect of the invention provides a process for heating a polymer-containing stream being transferred from a polymerization reactor which is increasing its production rate to a separation zone or device, which comprises a) passing the stream through a first heater or heaters each comprising a transfer line for the stream and means for heating the transfer line, and increasing the flowrate of the stream whilst maintaining the temperature of the polymer-containing stream at the exit of each heater at least 10° C., preferably at least 20° C. and more preferably at least 30° C. above the dew point of the stream, and the temperature of the stream at any point along the length of the each transfer line below the softening point of the polymer, and then b) passing part of the stream through an additional heater arranged in parallel to the first heater, said additional heater also comprising a transfer line for the stream and means for heating the transfer line whilst maintaining the temperature of the polymer-containing stream at the exit of all heaters above the dew point of the stream, and the temperature of the stream at any point along the length of the all transfer lines below the softening point of the polymer.

In an alternative aspect, the invention provides a process for heating a polymer-containing stream being transferred from a polymerization reactor to a separation zone or device, wherein part of the polymer-containing stream is diverted to a further heater also comprising at least one transfer line for the stream and means for heating the transfer line either when the pressure drop across the first heater exceeds 50%, preferably 70% of the total pressure drop between the reactor and the separation zone or device, or when the temperature of the polymer-containing stream at the heater outlet falls below 30° C. above the dew point temperature of the polymer-containing stream. It is possible to delay diverting part of the stream to a further heater until the temperature of the polymer-containing stream at the heater outlet falls below 20° C. or even 10° C. above the dew point temperature of the polymer-containing stream.

By transferring part of the polymer-containing stream to a further heater, the available surface area for heating is immediately increased by the surface area of the new heater, which permits an increase in the total amount of heat applied to the stream, and hence results in an increase in the temperature of the polymer-containing stream at the heater outlet. Thus it can be possible to maintain the outlet temperature of the stream at its desired level despite an increase in the flow, which could otherwise cause the temperature to fall.

Usually the above process operates when the polymerisation reactor is increasing its production rate, but it can also be triggered by changes such as a reduction in the solid concentration of the polymer-containing stream.

A related aspect of the invention provides a process for heating a polymer-containing stream being transferred from a polymerisation reactor to a separation zone or device, which comprises a) passing the stream through at least two heaters arranged in parallel and each comprising a transfer line for the stream and means for heating the transfer line, preferably whilst maintaining the temperature of the polymer-containing stream at the exit of each heater above the dew point of the stream, and the temperature of the stream at any point along the length of the each transfer line below the softening point of the polymer, and decreasing the flow-rate of the stream until the velocity at the exit of the heater falls below 40 m/s or less, and then b) shutting down one of the heaters and passing the stream only through the remaining heater or heaters.

In an alternative embodiment, part of the stream is diverted through an additional heater arranged in parallel to the first heater if the velocity at any point falls below the inlet velocity $V_i$, or alternatively if the pressure drop across the transfer line per unit length exceeds the desired maximum (usually 0.2 bar/m, preferably 0.1 bar/m), said additional heater also comprising a transfer line for the stream and means for heating the transfer line. In this embodiment also, the temperature of the polymer-containing stream at the exit of all heaters is preferably maintained above the dew point of the stream, and the temperature of the stream at any point along the length of the all transfer lines below the softening point of the polymer.

In all of the above aspects of the invention relating to operation of more than one heater, it is preferred that all the heaters operate according to the previously described aspects of the invention for a single heater.

In such a parallel heater embodiment of the invention, not all of the transfer lines may be required in service at any one time. In a further embodiment the polymerisation reactor has a plurality of withdrawal lines, each of which has its own transfer line. The invention also includes within its scope the use of single or parallel solids concentrating devices, with the usual arrangement being one solids concentrating devices located upstream of each transfer line.

In the parallel heater embodiment, it is preferred that when at least two heaters are operating, the average stream velocity across any cross-section of each heater's transfer line is maintained between 2 and 100 m/s, most preferably between 10 and 70 m/s.

A further aspect of the invention provides a process for heating a polymer-containing stream being transferred from a polymerization reactor to a separation zone or device, comprising passing the stream through at least two heaters operating in parallel, each heater comprising at least one transfer line for the stream and means for heating the transfer line, wherein the temperature of the polymer-containing stream at the outlet of all heaters is maintained above the dew point of the stream, and no heater has a volumetric flowrate of polymer-containing stream more than three times that of any other heater.

The performance of each transfer line can be monitored using parameters including: the flowrate, pressure and temperature of the steam into the heating jacket, the flowrate and temperature of the condensate leaving the heating jacket, or the position of the steam valve to measure the heat input (duty) to the stream; the pressure difference across the heater and the reactor pressure valve output to measure the flow or flow ratio into each transfer line, the relationship between steam flow and outlet temperature for each heater, heat balance of the reactor to calculate the total flow into all the heaters, and the difference between the vapour temperature at the heater outlet and the dew point of the process stream. Pressure drops across the transfer lines of each heater are preferably essentially the same as in the single heater embodiment as described above.

When operating more than one transfer line (heater) in parallel and close to maximum capacity, minor differences in installation and operating conditions of the transfer lines and associated upstream and downstream equipment and pipework can result in the transfer lines having unbalanced flows of slurry (loadings). Without correction of the flow partition, this can result in the transfer lines needing to be commissioned or decommissioned more often in order to maintain each within the correct operating range. To avoid this, the slurry loading on each transfer line may be automatically balanced by first determining the slurry flow through each transfer line, then calculating the average flow to all the transfer lines, and then applying a bias to a control valve upstream of each transfer line to adjust the feed rate in order to bring the slurry loading of each transfer line at least close to the average value. Preferably this is accomplished using the steam flow to the jacket surrounding each transfer line (ie the amount of heating applied to each transfer line) as a means for determining the slurry flow through each transfer line, since the steam flow is controlled to achieve the required temperature at the outlet of the transfer line, and the outlet temperature is determined by the slurry flow through each transfer line. The average of the steam flow to the transfer lines is then calculated and a bias is then applied to a control valve upstream of each transfer line to adjust the feed rate in order to maintain the loading of each transfer line, as measured by the steam flow, at between 50% and 150%, preferably between 90% and 110%, of the average value. If some of the heaters have different capacities, the average value may be a weighted average. The primary control function of the feed valves to all the transfer lines is to control the reactor pressure by manipulating the overall feed from the reactor to each transfer line. Thus all the control valves operate in parallel, opening and closing together, with the balancing control superimposed onto this action to balance the load on the transfer lines. In an alternative embodiment, one or more outlet valves in the reactor are used to the control the pressure, whilst others remain in a set position which is unchanged so long as the loading of the heaters is maintained at about the average value. It is also possible to control pressure by means other than the outlet valve from the reactor.

The slurry loading on the transfer lines may alternatively be determined by other means described previously, such as flow/velocity or pressure drop. The overall feed to the transfer lines may be controlled directly from reactor pressure or by flow control.

An available off-line heater should be commissioned when the chosen indicator(s) of the heater performance indicates that at least one of the on-line heaters is at 90%, preferably 80%, and most preferably 70% or more of maximum capacity. Regarding the definition of maximum capacity, for a given set of polymerisation reactor conditions and heater outlet conditions (pressure, temperature, stream composition and solid loading), a limit exists above which the mass flowrate at the heater outlet cannot be further increased whilst still maintaining the temperature of the polymer-containing stream at the exit of the heater above the dew point of the stream, and the temperature of the stream at any point along the length of the heater below the softening point of the polymer. The limit can be due to valve output limitation, power limitation, mechanical, safety or any other reasons. This is considered the maximum capacity. The outlet mass flowrate can be compared to this maximum capacity for the same reactor conditions and outlet conditions and expressed as % of maximum capacity.

When two or more heaters are operating in parallel, one of them should be shut down when at least one of them is operating at less than 60%, preferably less than 40% of maximum capacity.

In both single heater and multiple parallel heater embodiments, the flowrate of the polymer-containing stream withdrawn from the polymerisation reactor is preferably controlled using a pressure or flow control valve, most preferably located between a solids concentrating device and the transfer line heater inlet. The control valve is designed to have a pressure drop of between 45% and 90%, most preferably 50% and 80%, of the pressure drop between the reactor and the entry to the first downstream vessel. The heated transfer line is preferably designed to have a pressure drop between 5% and 75%, most preferably between 10 and 35%, of the pressure drop between the reactor and the entry to the degassing vessel. The ratio of the pressure drop across the control valve to the pressure drop across the heater is between 0.8 and 10, most preferably between 1 and 2.

The polymer-containing stream may contain a vapour component as well as a liquid component. Typically the vapour fraction of the fluid component of the polymer-containing stream at the inlet of the heater varies from 5 to 60 mol %. In one preferred embodiment of the present invention where there is a pressure or flow control valve upstream of the heater, and the vapour fraction of the stream at the heater inlet is between 25 and 60 mol %. The vapour fraction of the fluid component of the stream at the outlet of the heater can vary from 70 to 100 mol %, it is typically 95-100 mol %, most preferably greater than 99 mol %.

This invention can be applicable to any polymerisation process (eg gas-phase, slurry, or solution) containing a polymer stream that needs to be heated to volatilise liquid during depressurisation.

Processes for the co-polymerisation of olefins in the slurry phase are well known in the art. Such processes can be conducted for example by introducing the monomer and comonomer into a stirred tank or continuous loop reactor comprising polyolefin and a catalyst for the polymerisation. The reactor is typically controlled to achieve a desired melt index and density for the polymer at an optimum production and temperature.

Polyethylene slurry polymerisation processes typically withdraw polymer from the polymerisation reactor with significant quantities of liquid hydrocarbons, and the present invention is therefore particularly relevant to such processes. The slurry in such reactors typically comprises the particulate polymer, the hydrocarbon diluent(s), (co)monomer(s), catalyst, chain terminators such as hydrogen and other reactor additives. In particular the slurry will comprise 20-75, preferably 30-70 weight percent based on the total weight of the slurry of particulate polymer and 80-25, preferably 70-30 weight percent based on the total weight of the slurry of suspending medium, where the suspending medium is the sum of all the fluid components in the reactor and comprises the diluent, olefin monomer and any additives; the diluent can be an inert diluent or it can be a reactive diluent such as a liquid olefin monomer. Where the principal diluent is an inert diluent the olefin monomer typically comprises 2-20 wt %, more particularly 4-10 wt % of the slurry. However when the monomer is propylene, it can comprise almost 100 wt % of the slurry.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

This invention is particularly related to polymerisation in a loop reactor where the slurry is circulated in the reactor typically by means of a pump or agitator. Liquid full loop reactors are particularly well known in the art and are described for example in U.S. Pat. Nos. 3,152,872, 3,242,150 and 4,613,484. The loop reactor is of a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of the loop reactor can vary but is typically in the range 20 to 170 m$^3$.

In commercial plants, the particulate polymer is separated from the diluent in a manner such that the diluent is not exposed to contamination so as to permit recycle of the diluent to the polymerization zone with minimal if any purification. Separating the particulate polymer produced by the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal via a single or multiple withdrawal ports, the location of which can be anywhere on the loop reactor but is usually adjacent to the downstream end of a horizontal section of the loop. As previously discussed, the operation of large diameter reactors with high solids concentrations in the slurry minimises the quantity of the principal diluent withdrawn from the polymerisation loop. Use of concentrating devices on the withdrawn polymer slurry such as hydrocylones (single or in the case of multiple hydrocyclones in parallel or series) further enhances the recovery of diluent in an energy efficient manner since significant pressure reduction and vaporisation of recovered diluent is avoided.

The withdrawn, and preferably concentrated, polymer slurry is usually depressurised prior to being transferred via the heater of the present invention to a primary flash vessel.

The diluent and any monomer vapours recovered in the primary flash vessel are typically condensed, preferably without recompression, and reused in the polymerization process. The pressure of the primary flash vessel is usually controlled to enable condensation with a readily available cooling medium (e.g. cooling water) of essentially all of the flash vapour prior to any recompression. The pressure in said primary flash vessel is generally in the range 2-25 bara, more typically 5-20 bara and most often 6-11 bara. The solid material recovered from the primary flash vessel is usually passed to a secondary flash vessel to remove residual volatiles. Alternatively the slurry may be passed to a flash vessel of lower pressure than in the above mentioned primary vessel such that recompression is needed to condense the recovered diluent. Use of a high pressure flash vessel is preferred.

More specifically, an example of the type of polymerisation process for which the invention is particularly useful is the continuous polymerization of olefins, preferably alpha mono olefins, in an reaction zone, preferably an elongated tubular closed loop. The olefin(s) is continuously added to, and contacted with, a catalyst in a hydrocarbon diluent. The monomer(s) polymerise to form a slurry of solid particulate polymer suspended in the polymerisation medium or diluent.

The rate of withdrawal of polymer product is controlled by a valve upstream of the heater of the invention.

The solids concentration in the slurry in the reactor will typically be above 20 vol %, preferably about 30 volume %, for example 20-40 volume %, preferably 25-35 volume % where volume % is [(total volume of the slurry−volume of the suspending medium)/(total volume of the slurry)]×100. The solids concentration measured as weight percentage, which is equivalent to that measured as volume percentage, will vary according to the polymer produced but more particularly according to the diluent used. Where the polymer produced is polyethylene and the diluent is an alkane, for example isobutane, it is preferred that the solids concentration is above 30 wt % in particular above 40 wt %, for example in the range 40-60 wt % preferably 45-55 wt % based on the total weight of the slurry. We have found that for high solids loadings, particularly above 40 wt %, reliable product withdrawal and heating between the polymerisation reactor and the degassing vessel (as evidenced by fouling, flow variations and/or heat transfer) can be maintained within acceptable operating limits by use of the heater of the invention.

This type of process may optionally be carried out in a multiple reactor system. The second or any subsequent reactor of the multiple reactor system may be another loop reactor or any reactor for the polymerisation of olefins, for example a fluidised-bed reactor. However, usually the second or any subsequent reactor of the multiple reactor system is another loop reactor. Such multiple reactor systems can be used to make monomodal or multimodal, preferably multimodal polymers.

In the case of multiple reactors in series, a first reactor of the series is supplied with catalyst or prepolymer and optionally the cocatalyst in addition to the diluent and monomer, and each subsequent reactor is supplied with, at least, monomer, in particular ethylene and with the slurry arising from a preceding reactor of the series, this mixture comprising the catalyst and a mixture of the polymers produced in a preceding reactor of the series. It is possible to supply a second reactor and/or, if appropriate, at least one of the subsequent reactors with fresh catalyst and/or cocatalyst. However, it is more common to introduce the catalyst and the cocatalyst exclusively into a first reactor.

In the case where the plant comprises at least two reactors in series, the polymer of highest melt index and the polymer of lowest melt index can be produced in two adjacent or non-adjacent reactors in the series. Hydrogen is maintained at (i) a low (or zero) concentration in the reactor(s) manufacturing the high molecular weight components, e.g. hydrogen percentages including between 0-0.1 vol % and at (ii) a very high concentration in the reactor(s) manufacturing the low molecular weight components e.g. hydrogen percentages between 0.5-2.4 vol %. The reactors can equally be operated to produce essentially the same polymer melt index in successive reactors.

When such reactor systems produce polymers of molecular weights less than 50 kDaltons or greater than 150 kDaltons there have in the past been observed particular problems with reactor fouling and agglomeration in the heater between the polymerisation reactor and the degassing vessel. These problems can be accentuated by high polymer solids concentrations in the heater. This is another problem which can be ameliorated by use of the heater of the present invention.

Example 1

In this example a polymerisation reactor discharges a slurry containing 50 wt % solid polyethylene with an average particle diameter of 1.5 mm at a rate of 60 tonnes/hour The reactor pressure is 40 barg, and before entering the heater the polymer-containing stream passes through a control valve which lets the pressure down to 16 barg. The composition of the diluent carrying the solid polymer is 91 mol % isobutane, 8 mol % ethylene and 1 mol % hexene. No additional fluid is added to the stream.

The stream passes into a heater in the form of a transfer line comprising five vertical legs, the heated portions of which are each of 40 m in length, giving a total heated length of 200 m (the length of the unheated elbows connecting each vertical leg is ignored). The diameter of the first two legs (to 80 m, or 40% of the total heated length) is 76 mm, and the diameter of the final three legs (120 m, or 60% of the total heated length) is 102 mm. Thus the ratio of the two diameters is 1.33.

The conditions inside the transfer line are summarised in Table 1 below.

TABLE 1

| % of heated length | Heated Length (m) | Diameter (mm) | Pressure (kPa) | Vapour fraction (kg/kg) | Vol flow vapour ($m^3$/h) | Vol flow liquid ($m^3$/h) | Vol flow solid ($m^3$/h) | Velocity m/s | Temp °C. | Internal wall temp |
|---|---|---|---|---|---|---|---|---|---|---|
| 0 - inlet L1 | 0 | 76 | 1692 | 0.17 | 125.7 | 53.9 | 31.9 | 12.3 | 79.2 | 97.3 |
| 20 - end L1 | 40 | 76 | 1509 | 0.37 | 297.8 | 40.9 | 31.9 | 21.5 | 77.4 | 95.9 |
| 20 - inlet L2 | 40 | 76 | 1484 | 0.38 | 312.5 | 40.1 | 31.9 | 22.3 | 76.7 | 94.5 |
| 40 - end L2 | 80 | 76 | 1418 | 0.54 | 463.5 | 29.5 | 31.9 | 30.5 | 76.5 | 97.6 |
| 40 - inlet L3 | 80 | 102 | 1431 | 0.54 | 453.7 | 29.9 | 31.9 | 17.5 | 76.9 | 98.3 |
| 60 - end L3 | 120 | 102 | 1319 | 0.75 | 685.4 | 15.9 | 31.9 | 24.9 | 75.0 | 97.9 |
| 60 - inlet L4 | 120 | 102 | 1302 | 0.76 | 702.5 | 15.4 | 31.9 | 25.5 | 74.4 | 97.0 |
| 80 - end L4 | 160 | 102 | 1226 | 0.96 | 940.7 | 2.7 | 31.9 | 33.2 | 73.5 | 96.8 |
| 80 - inlet L5 | 160 | 102 | 1199 | 0.97 | 974.6 | 2.0 | 31.9 | 34.3 | 72.7 | 97.0 |
| 100 - end L5 | 200 | 102 | 1020 | 1.00 | 1283.7 | 0.0 | 31.9 | 44.7 | 80.1 | 98.8 |

At the outlet of the heater, the dewpoint of the stream is 69.8° C.

From the data in the above table, key points are the substantial drop in velocity after the increase in diameter at 80 m. Otherwise, velocity steadily increases along the heater as the proportion of vapour increases to 100% by the outlet of the heater, and the volumetric flow of liquid correspondingly falls to zero. It can be seen that the average velocity at 80% along the heated length of the line is at least 33 m/s, and at the outlet the temperature of the fluid (80.1° C.) is 10.3° C. above its dewpoint.

Example 2 (Comparative)

In this example a polymerisation reactor discharges a slurry containing 52 wt % solid polyethylene with an average particle diameter of 1.5 mm at a rate of 23 tonnes/hour The reactor pressure is 40 barg, and before entering the heater the polymer-containing stream passes through a control valve which lets the pressure down to 16 barg. The composition of the diluent carrying the solid polymer is 91 mol % isobutane, 8 mol % ethylene and 1 mol % hexene. No additional fluid is added to the stream.

The stream passes into a heater in the form of a transfer line comprising five vertical legs, the heated portions of which are each of 40 m in length, giving a total heated length of 200 m (the length of the unheated elbows connecting each vertical leg is ignored). The diameter of the first three legs (to 120 m, or 60% of the total heated length) is 76 mm, and the diameter of the last two legs (80 m, or 40% of the total heated length) is 152 mm. Thus the ratio of the two diameters is 2.

The conditions inside the transfer line are summarised in Table 2 below.

TABLE 2

| % of heated length | Heated Length (m) | Diameter (mm) | Pressure (kPa) | Vapour fraction (kg/kg) | Vol flow vapour (m³/h) | Vol flow liquid (m³/h) | Vol flow solid (m³/h) | Velocity m/s | Temp ° C. | Internal wall temp |
|---|---|---|---|---|---|---|---|---|---|---|
| 0 - inlet L1 | 0 | 76 | 1509 | 0.00 | 0.0 | 23.2 | 12.8 | 2.1 | 61.9 | 96.1 |
| 20 - end L1 | 40 | 76 | 1313 | 0.18 | 66.9 | 18.9 | 12.8 | 5.7 | 67.1 | 95.9 |
| 20 - inlet L2 | 40 | 76 | 1311 | 0.19 | 67.4 | 18.9 | 12.8 | 5.8 | 67.0 | 95.2 |
| 40 - end L2 | 80 | 76 | 1389 | 0.36 | 119.7 | 15.0 | 12.8 | 8.6 | 73.4 | 95.7 |
| 40 - inlet L3 | 80 | 76 | 1386 | 0.37 | 120.6 | 14.9 | 12.8 | 8.6 | 73.3 | 94.5 |
| 60 - end L3 | 120 | 76 | 1300 | 0.67 | 229.5 | 7.8 | 12.8 | 14.5 | 73.6 | 94.0 |
| 60 - inlet L4 | 120 | 102 | 1304 | 0.66 | 228.1 | 7.9 | 12.8 | 3.7 | 73.7 | 100.4 |
| 80 - end L4 | 160 | 102 | 1339 | 0.91 | 300.1 | 2.1 | 12.8 | 4.7 | 77.0 | 105.2 |
| 80 - inlet L5 | 160 | 102 | 1338 | 0.91 | 300.4 | 2.1 | 12.8 | 4.7 | 77.0 | 105.4 |
| 100 - end L5 | 200 | 102 | 1307 | 1.00 | 348.4 | 0.0 | 12.8 | 5.4 | 82.0 | 105.8 |

At the outlet of the heater, the dewpoint of the stream is 77.4° C.

From the data in the above table, it can be seen that as in Example 1 there is a substantial drop in velocity after the increase in diameter, which in this case is at 120 m. However it can be seen that whereas in Example 1 the lowest average velocities are 12.3 m/s at the heater inlet and then 17.5 m/s after the expansion, in this Example the average velocity is significantly lower than these values, in fact less than 10 m/s, throughout almost the whole length of the heater. In particular, the average velocity at 80% along the heated length of the line is just 4.7 m/s, which is lower than that at 20% along the heated length. At the outlet of the heater, the temperature of the fluid is 82.0° C., which is just 4.6° C. above its dewpoint, whereas the internal wall temperature is 105.8° C., compared with 98.8° C. in Example 1.

The practical consequence of these figures is that due to the lower velocities and higher wall temperature, the risk of fouling in this Example is significantly higher than in Example 1.

The invention claimed is:

1. Process for heating a polymer-containing stream being transferred from a polymerization reactor to a separation zone or device, comprising passing the stream through a heater comprising at least one transfer line for the stream and a heater for heating the transfer line, wherein the average particle size of the solid polymer is less than 3 mm, the mass flowrate of the polymer-containing stream exiting the heater is no more than 15% greater than the mass flowrate exiting the reactor, the average velocity of the polymer-containing stream either at a point 80% along the length of the heated part of the transfer line measured from the transfer line inlet, or at the transfer line outlet, is at least 6 m/s, and the pressure drop across the transfer line per unit length is between 0.0125 bar/m and 0.1 bar/m.

2. Process according to claim 1, wherein the average velocity of the polymer-containing stream at 80% along the length of the heated part of the transfer line measured from the transfer line inlet is equal to or greater than its average velocity at 20% along the length of the heated part of the transfer line.

3. Process according to claim 1, wherein the average particle size of the solid polymer is less than 2 mm.

4. Process according to claim 1, wherein the mass flowrate of the polymer-containing stream exiting the heater is substantially the same as the mass flowrate exiting the reactor.

5. Process according to claim 1, wherein the ratio of the average velocity of the polymer-containing stream at 80% along the length of the heated part of the transfer line to its average velocity at 20% along the length of the heated part of the transfer line is greater than 1.1.

6. Process according to claim 1, wherein the average velocity of the polymer-containing stream at 60% along the length of the heated part of the transfer line measured from the transfer line inlet is equal to or greater than its average velocity at 20% along the length of the heated part of the transfer line.

7. Process according to claim 1, wherein the ratio of the transfer line's diameter 80% along its heated length, $D_{80}$, to the diameter 20% along its heated length, $D_{20}$, is greater than 1.

8. Process according to claim 1, wherein the temperature of the internal surface of the transfer line from 50% to 100% along its heated length is maintained below the softening point of the polymer.

9. Process according to claim 1, wherein the heat input to the polymer-containing stream is adjusted by changing the temperature of the heating medium in contact with the outer surface, and/or by changing the size of the heated area of the transfer line.

10. Process according to claim 1, wherein the average velocity of the polymer-containing stream either at a point 80% along the length of the heated part of the transfer line measured from the transfer line inlet, or at the transfer line outlet, is at least 8 m/s.

11. Process according to claim 1, wherein the average velocity of the polymer-containing stream either at a point 80% along the length of the heated part of the transfer line measured from the transfer line inlet, or at the transfer line outlet, is at least 10 m/s.

12. Process according to claim 1, wherein the pressure drop across the transfer line per unit length is between 0.0125 bar/m and 0.04 bar/m.

13. Process according to claim 3, wherein the average particle size of the solid polymer is less than 1 mm.

14. Process according to claim 5, wherein the ratio of the average velocity of the polymer-containing stream at 80% along the length of the heated part of the transfer line to its average velocity at 20% along the length of the heated part of the transfer line is greater than 1.3.

15. Process according to claim 7, wherein the ratio of the transfer line's diameter 80% along its heated length, $D_{80}$, to the diameter 20% along its heated length, $D_{20}$, is greater than 1.2.

16. Process according to claim 7, wherein the ratio of the transfer line's diameter 80% along its heated length, $D_{80}$, to the diameter 20% along its heated length, $D_{20}$, is greater than 1.3.

17. Process according to claim 8, wherein the temperature of the internal surface of the transfer line along all of its heated length is maintained below the softening point of the polymer.

* * * * *